(12) United States Patent
Beck et al.

(10) Patent No.: US 9,188,199 B2
(45) Date of Patent: Nov. 17, 2015

(54) MULTI-RATIO TRANSMISSION

(71) Applicant: ZF Friedrichshafen AG, Friedrichshafen (DE)

(72) Inventors: Stefan Beck, Eriskirch (DE); Timo Wehlen, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 46 days.

(21) Appl. No.: 14/376,622

(22) PCT Filed: Jan. 10, 2013

(86) PCT No.: PCT/EP2013/050341
§ 371 (c)(1),
(2) Date: Aug. 5, 2014

(87) PCT Pub. No.: WO2013/117366
PCT Pub. Date: Aug. 15, 2013

(65) Prior Publication Data
US 2015/0018165 A1   Jan. 15, 2015

(30) Foreign Application Priority Data
Feb. 6, 2012 (DE) .................... 10 2012 201 690

(51) Int. Cl.
*F16H 3/46* (2006.01)
*F16H 3/66* (2006.01)
(Continued)

(52) U.S. Cl.
CPC .. *F16H 3/46* (2013.01); *F16H 3/66* (2013.01); *F16H 3/725* (2013.01); *F16H 37/04* (2013.01);
(Continued)

(58) Field of Classification Search
CPC ..... F16H 3/66; F16H 2003/442; F16H 3/666; F16H 2200/201; F16H 2200/006; Y02T 10/6217
See application file for complete search history.

(56) References Cited

U.S. PATENT DOCUMENTS 4,395,925 A   8/1983   Gaus
6,572,507 B1  6/2003   Korkmaz et al.
(Continued)

FOREIGN PATENT DOCUMENTS

DE   29 36 969 A1   4/1981
DE   199 12 480 A1  9/2000
(Continued)

OTHER PUBLICATIONS

ESPACENET machine translation of DE 2012 201 690.2 claims.*
(Continued)

*Primary Examiner* — Colby M Hansen
(74) *Attorney, Agent, or Firm* — Davis & Bujold, P.L.L.C.; Michael J. Bujold

(57) ABSTRACT

A multistage transmission with eight forward and one reverse gear, including input and output shafts, planetary gearsets, gear stages, shift elements and shafts. The input shaft couples the carrier of gearset (P1) and, via clutch (15), can couple shaft (5) which couples, via clutch (59), shaft (9) which couples the sun gear of gearset (P3) and, via clutch (58), can couple shaft (8) and the ring gear of gearset (P2). The ring gear of gearset (P1) couples shaft (6) connected to the sun gear of gearset (P2). Shaft (3) couples the sun and ring gears of respective gearsets (P1, P3) and can couple, via brake (03), the housing (G). The carrier of gearset (P2) couples shaft (4), gear stage (S1) and the output shaft. The carrier of gearset (P3) couples shaft (7), gear stage (S2) and the output shaft. The clutch (56) couples shafts (5, 6) to block gearset (P2).

10 Claims, 3 Drawing Sheets

(51) Int. Cl.
  *F16H 3/72* (2006.01)
  *F16H 37/04* (2006.01)
  *B60K 6/48* (2007.10)
  *F16H 3/44* (2006.01)

(52) U.S. Cl.
  CPC ... *B60K 2006/4825* (2013.01); *F16H 2003/442* (2013.01); *F16H 2200/006* (2013.01); *F16H 2200/0008* (2013.01); *F16H 2200/201* (2013.01); *F16H 2200/2007* (2013.01); *F16H 2200/2043* (2013.01); *Y02T 10/6252* (2013.01)

(56) References Cited

U.S. PATENT DOCUMENTS

| | | | |
|---|---|---|---|
| 7,291,085 B2 * | 11/2007 | Park | 475/280 |
| 7,549,942 B2 | 6/2009 | Gumpoltsberger | |
| 7,699,743 B2 | 4/2010 | Diosi et al. | |
| 8,210,981 B2 | 7/2012 | Bauknecht et al. | |
| 8,870,706 B2 * | 10/2014 | Imamura et al. | 475/282 |
| 2008/0090697 A1 | 4/2008 | Ortmann et al. | |
| 2008/0242492 A1 | 10/2008 | Phillips et al. | |
| 2009/0082158 A1 * | 3/2009 | Wittkopp et al. | 475/218 |
| 2009/0305837 A1 | 12/2009 | Hiraiwa | |
| 2010/0035718 A1 | 2/2010 | Saitoh | |
| 2010/0069191 A1 | 3/2010 | Swales et al. | |
| 2010/0210399 A1 | 8/2010 | Wittkopp et al. | |
| 2011/0124456 A1 * | 5/2011 | Sung | 475/35 |
| 2011/0124457 A1 * | 5/2011 | Sung | 475/53 |
| 2014/0378262 A1 * | 12/2014 | Beck et al. | 475/209 |
| 2015/0018164 A1 * | 1/2015 | Beck et al. | 475/282 |
| 2015/0031497 A1 * | 1/2015 | Beck et al. | 475/311 |
| 2015/0031498 A1 * | 1/2015 | Beck et al. | 475/317 |
| 2015/0051043 A1 * | 2/2015 | Beck et al. | 475/275 |

FOREIGN PATENT DOCUMENTS

| | | |
|---|---|---|
| DE | 10 2004 023 949 A1 | 12/2005 |
| DE | 10 2004 038 516 A1 | 2/2006 |
| DE | 10 2005 010 210 A1 | 9/2006 |
| DE | 10 2006 001 746 A1 | 8/2007 |
| DE | 10 2006 001 760 A1 | 8/2007 |
| DE | 10 2006 006 637 A1 | 9/2007 |
| DE | 10 2008 051 177 A1 | 8/2009 |
| DE | 10 2008 000 428 A1 | 9/2009 |
| DE | 10 2009 009 300 A1 | 9/2009 |
| DE | 10 2009 018 958 A1 | 2/2011 |
| DE | 10 2009 047 265 A1 | 6/2011 |
| JP | 2009-270667 A | 11/2009 |

OTHER PUBLICATIONS

German Search Report Corresponding to 10 2012 201 686.4 mailed Aug. 9, 2013 6 pages.
German Search Report Corresponding to 10 2012 201 687.2 mailed Aug. 9, 2013 6 pages.
German Search Report Corresponding to 10 2012 201 690.2 mailed Aug. 12, 2013 6 pages.
German Search Report Corresponding to 10 2012 201 689.9 mailed Aug. 12, 2013 6 pages.
German Search Report Corresponding to 10 2012 201 692.9 mailed Aug. 6, 2013 6 pages.
German Search Report Corresponding to 10 2012 201 685.6 mailed Aug. 7, 2013 6 pages.
German Search Report Corresponding to 10 2012 201 684.8 mailed Aug. 22, 2013 6 pages.
German Search Report Corresponding to 10 2012 201 678.3 mailed Aug. 22, 2013 6 pages.
German Search Report Corresponding to 10 2012 201 682.1 mailed Aug. 22, 2013 6 pages.
German Search Report Corresponding to 10 2012 201 681.3 mailed Aug. 22, 2013 6 pages.
International Search Report Corresponding to PCT/EP2013/050337 mailed Mar. 22, 2013 8 pages.
International Search Report Corresponding to PCT/EP2013/050338 mailed Mar. 22, 2013 8 pages.
International Search Report Corresponding to PCT/EP2013/050340 mailed Mar. 22, 2013 8 pages.
International Search Report Corresponding to PCT/EP2013/050341 mailed Mar. 22, 2013 8 pages.
International Search Report Corresponding to PCT/EP2013/050344 mailed Mar. 22, 2013 8 pages.
International Search Report Corresponding to PCT/EP2013/050345 mailed Mar. 22, 2013 8 pages.
International Search Report Corresponding to PCT/EP2013/050347 mailed Mar. 27, 2013 6 pages.
International Search Report Corresponding to PCT/EP2013/050349 mailed Mar. 27, 2013 6 pages.
International Search Report Corresponding to PCT/EP2013/050350 mailed Mar. 27, 2013 6 pages.
International Search Report Corresponding to PCT/EP2013/050782 mailed Feb. 27, 2013 5 pages.
Written Opinion Corresponding to PCT/EP2013/050337 mailed Mar. 22, 2013 7 pages.

* cited by examiner

| GEAR | ENGAGED SHIFT ELEMENTS | | | | | TRANS. RATIO | GEAR STEP |
| --- | --- | --- | --- | --- | --- | --- | --- |
| | BRAKE | CLUTCH | | | | | |
| | 03 | 56 | 15 | 58 | 59 | i | φ |
| 1 | ● | | ● | | ● | 5.084 | |
| 2 | ● | ● | | | ● | 3.214 | 1.582 |
| 3 | | ● | ● | | ● | 1.970 | 1.631 |
| 4 | | ● | | ● | ● | 1.582 | 1.245 |
| 5 | | | ● | ● | ● | 1.257 | 1.259 |
| 6 | | ● | ● | ● | | 1.000 | 1.257 |
| 7 | ● | | ● | ● | | 0.819 | 1.221 |
| 8 | ● | ● | | ● | | 0.632 | 1.296 |
| R | ● | | | ● | ● | -3.575 | 8.040 |

Fig. 2

MULTI-RATIO TRANSMISSION

This application is a National Stage completion of PCT/EP2013/050341 filed Jan. 10, 2013, which claims priority from German patent application serial no. 10 2012 201 690.2 filed Feb. 6, 2012.

FIELD OF THE INVENTION

The present invention relates to a multi-stage transmission, in particular an automatic transmission for a motor vehicle.

BACKGROUND OF THE INVENTION

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is provided optionally with a lock-up clutch.

Such automatic transmissions have been described numerous times in the prior art and are continually undergoing further development and improvement. These transmissions should have a sufficient number of forward gears as well as at least one reverse gear, and a suitable transmission ratio which is highly favourable for motor vehicles with a high overall gear ratio as well as a favourable gear interval. Furthermore, they should enable a high startup transmission ratio in the forward direction and contain a direct gear. In addition, an automatic transmission requires moderate complexity and few shift elements, wherein only one shift element is engaged and one shift element is disengaged during sequential shifting, Such an automatic transmission is known, for example, from DE 199 12 480 B4 by the applicant. It comprises three single-carrier planetary gear sets, as well as three brakes and two clutches for shifting six forward gears and one reverse gear, an input driveshaft and an output shaft, wherein the carrier for the first planetary gear set is continuously connected to the ring gear of the second planetary gear set, and the carrier for the second planetary gear set is continuously connected to the ring gear of the third planetary gear set, and the input driveshaft is directly connected to the sun gear of the second planetary gear set, Furthermore, in the known transmission, the input driveshaft is connectable to the sun gear of the first planetary gear set by means of the first clutch, and to the carrier of the first planetary set by means of the second clutch, wherein the sun gear of the first planetary gear set is connectable by means of the first brake to a housing of the transmission, and the carrier for the first planetary gear set is connectable by means of the second brake to the housing of the transmission, wherein the sun gear of the third planetary gear set is connectable by means of the third brake to the housing of the transmission. The input driveshaft of the transmission is continuously connected to the carrier for the third planetary gear set and the ring gear of the first planetary gear set.

SUMMARY OF THE INVENTION

The present invention addresses the problem of presenting a multi-stage transmission that, viewed axially, requires less installation space, thus enabling the transmission to be installed, and optionally, the transmission to be hybridized, as a front-transverse system. Furthermore, the efficiency is improved in regard to drag and gearing losses.

This object is attained according to the invention by the features described below.

Accordingly, a multi-stage transmission is proposed which has an input driveshaft and an output shaft that are disposed in a housing. Furthermore, the transmission comprises three planetary gear sets, hereinafter termed the first, second and third planetary gear set, at least nine rotatable shafts, hereinafter termed the input driveshaft, output shaft, third, fourth, fifth, sixth, seventh, eighth and ninth shaft, a first and a second spur gear stage in connection with a countershaft disposed parallel to the longitudinal axis of the planetary gear sets and serving as an output shaft for the transmission, and five shift elements comprising a brake and clutches, whose selective engagement produces different transmission ratios between the input driveshaft and the output shaft such that preferably eight forward gears and one reverse gear can be implemented.

The planetary gear sets are preferably designed as minus planetary gear sets. As is well known, a simple minus planetary gear set comprises a sun gear, a ring gear, and a carrier on which the planetary gears are rotatably carried, the planetary gears meshing with the sun gear and the ring gear. As a result, when the carrier is fixed, the ring gear has a direction of rotation that is opposite that of the sun gear. In contrast, a simple plus planetary gear set comprises a sun gear, a ring gear and a carrier, on which inner and outer planet gears are rotatably carried, wherein all inner planet gears mesh with the sun gear and all outer planet gears mesh with the ring gear, and each inner planet gear meshes with only one outer planet gear. As a result, when the carrier is fixed, the ring gear has the same direction of rotation as the sun gear, and a positive stationary transmission ratio results.

Furthermore, preferably two of the planetary gear sets of the transmission are disposed above one another from a radial perspective to thereby achieve a very short overall length, whereby the transmission can be installed in a front-transverse design in passenger cars.

Advantageously, the second planetary gear set, viewed radially, is disposed above the first planetary gear set, wherein the planetary gear sets, viewed axially, are disposed in the sequence of the first planetary gear set/second planetary gear set, third planetary gear set. In the context of additional embodiments of the invention, the axial sequence of the planetary gear sets can be arbitrary; in addition, the planetary gear sets can also be disposed sequentially from an axial perspective.

According to the invention, the input driveshaft is connected to the carrier of the first planetary gear set and, by means of a first clutch, is releasably connectable to the fifth shaft that is connected to the sun gear of the third planetary gear set and is releasably connected, by means of a second clutch, to the eighth shaft connected to the ring gear of the second planetary gear set, wherein the ring gear of the first planetary gear set is connected to the sixth shaft connected to the sun gear of the second planetary gear set.

The ring gear of the first planetary gear set is connected to the sixth shaft that is connected to the sun gear of the second planetary gear set, wherein the carrier of the second planetary gear set is connected to the fourth shaft, which is connected by means of the first spur gear stage to the output shaft.

Instead of, or in addition to, the first spur gear stage, the fourth shaft can be releasably connectable to the output shaft by means of a chain, belt or one or more other components.

Furthermore, the carrier of the third planetary gear set is connected to the seventh shaft, which is connected by means of the second spur gear stage to the output shaft of the transmission.

Instead of, or in addition to, the second spur gear stage, the fourth shaft can be releasably connectable to the output shaft by means of a chain belt or one or more other components.

The third shaft of the transmission is connected to the sun gear of the first planetary gear set and the ring gear of the third planetary gear set, and can be coupled by means of the brake to the housing of the transmission.

According to the invention, a fourth clutch is provided, the engaging of which can block the second planetary set. The fourth clutch is designed as a clutch which releasably connects the sixth shaft to the fifth shaft such that the second planetary gear set can be blocked by coupling the ring gear of the second planetary gear set to the sun wheel of the second planetary gear set.

The embodiment of the multi-stage transmission according to the invention results in transmission ratios that are particularly suitable for passenger vehicles, and in a greater overall gear ratio of the multi-stage transmission, thereby improving driving smoothness and significantly reducing fuel consumption.

Furthermore, design complexity is significantly reduced with the multi-stage transmission according to the invention due to a low number of shift elements. Using the multi-stage transmission according to the invention, it is advantageously possible to perform a start-up using a hydrodynamic converter, an external start-up clutch, or any other suitable external start-up element. It is also conceivable to perform a start-up using a start-up element integrated in the transmission. Preferably, a shift element that is actuated in the first forward gear and in the reverse gear is suitable for this.

Moreover, the multi-stage transmission, according to the invention, results in good efficiency in the main drive gears with respect to drag losses and gearing losses.

Furthermore, low torques are present in the shift elements and in the planetary gear sets of the multi-stage transmission, thereby advantageously reducing wear in the multi-stage transmission. in addition, the low torques make it possible to utilize correspondingly low dimensions, thereby reducing the necessary installation space and related costs. Furthermore, the rotational speeds of the shafts, shift elements, and planetary gear sets are low.

In addition, the transmission according to the invention is designed such that the required installation space, viewed axially, is small, which enables hybridization of the transmission as a front-transverse system.

In addition, the transmission according to the invention is designed such that the required installation space, viewed axially, is small, which enables hybridization of the transmission as a front-transverse system.

BRIEF DESCRIPTION OF THE DRAWINGS

The invention is described in greater detail in the following, as an example, with reference to the attached Figures. They show:

FIG. 2: an example of a shift pattern for a multi-stage transmission according to FIG. 1;

DETAILED DESCRIPTION OF THE PREFERRED EMBODIMENTS

Figure 1:
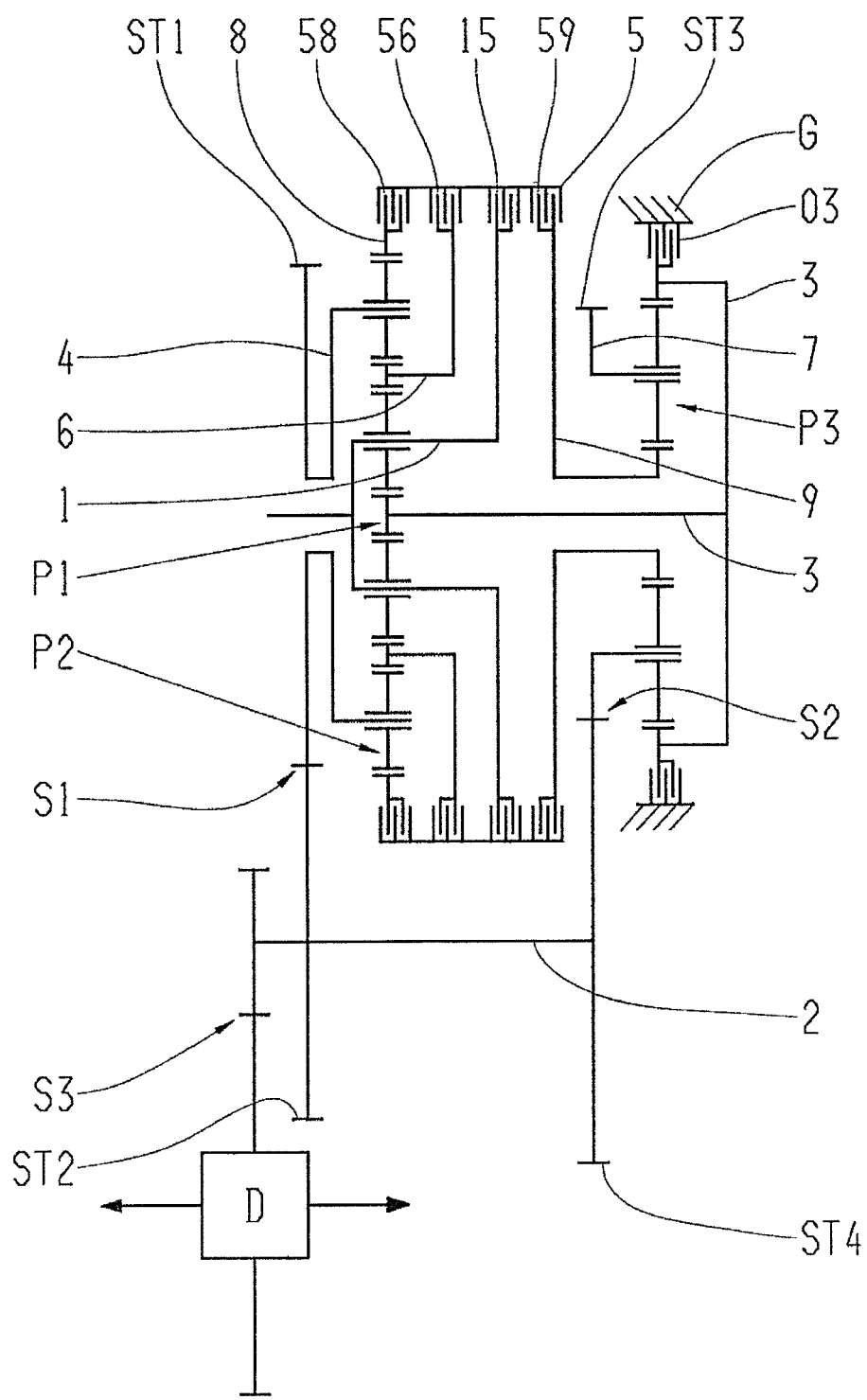
FIG. 1: a schematic view of a preferred embodiment of a multi-stage transmission according to the invention.

FIG. 1 shows a multi-stage transmission according to the invention with a first planetary gear set P1, a second planetary gear set P2, and a third planetary gear set P3, a first spur gear stage S1 and a second spur gear stage S2 in connection with a countershaft disposed parallel to the longitudinal axis of the coaxially disposed planetary gear sets P1, P2, P3, the countershaft serving as an output shaft 2 of the transmission which is disposed in a housing G.

In the portrayed example, the second planetary gear set P2, viewed radially, is disposed above the first planetary gear set P1, whereby the overall length of the transmission is advantageously reduced. Viewed axially, the planetary gear sets P1, P2, P3 are disposed in the sequence of the first planetary gear set P1/second planetary gear set P2, third planetary gear set P3.

At least one planetary gear set of the transmission can be designed as a plus planetary gear set if the carrier and ring gear connection are exchanged and, simultaneously, the value of the stationary transmission ratio is increased by 1 in comparison to the design as a minus planetary gear set.

As shown in FIG. 1, five shift elements are provided, namely, one brake 03 and four clutches 15, 58, 59 and 56. The spatial arrangement of the shift elements can be arbitrary, and is limited only by the dimensions of the outer design. The clutches and the brake of the transmission are preferably designed as friction shift elements or lamellar shift elements.

Selective shifting of eight forward gears and one reverse gear can be implemented using these shift elements. The multi-stage transmission according to the invention has a total of at least nine rotatable shafts, wherein the input driveshaft forms the first shaft 1, and the output shaft forms the second shaft 2 of the transmission.

According to the invention, in the multi-stage transmission according to FIG. 1, the input driveshaft 1 is connected to the carrier of the first planetary gear set P1 and, by means of a first clutch 15, is releasably connectable to the fifth shaft 5 that, by means of a third clutch, is releasably connectable to the ninth shaft 9 connected to the sun gear of the third planetary gear set P3 and is releasably connectable by means of a second clutch 58 to the eighth shaft 8 connected to the ring gear of the second planetary gear set P2, wherein the ring gear of the first planetary gear set P1 is connected to the sixth shaft 6 which is connected to the sun gear of the second planetary gear set P2. The third shaft 3 of the transmission is connected to the sun gear of the first planetary gear set P1 and the ring gear of the third planetary gear set P3, and can be coupled by means of the brake 03 to the housing G of the transmission.

With reference to FIG. 1, the carrier of the second planetary gear set P2 is connected to the fourth shaft 4 that is connected to a first spur gear ST1 of the first spur gear stage S1 whose second spur gear ST2 is connected to the output shaft 2.

Furthermore, the carrier of the third planetary gear set P3 is connected to the seventh shaft 7 which is connected to a first spur gear ST3 of the second spur gear stage S2 whose second spur gear ST4 is connected to the output shaft 2.

Furthermore, a fourth clutch 56 is provided in the transmission according to the invention and releasably connects the sixth shaft 6 to the fifth shaft 5. Viewed axially, the first, second, third and fourth clutch 15, 58, 59, 56 can be disposed next to each other.

Figure 6:
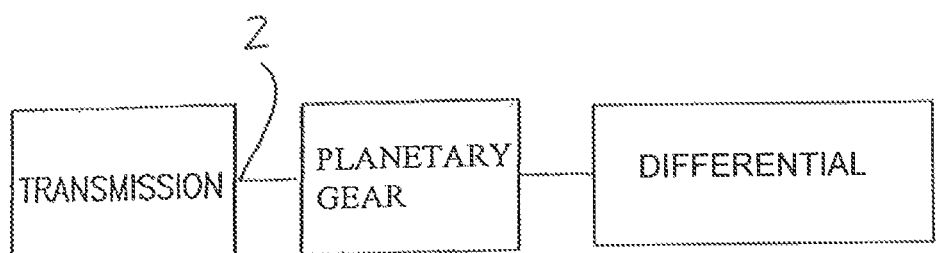
FIG. 6: diagrammatically shows output shaft of the transmission connected to the input shaft of a differential by at least one planetary gear.

In the exemplary embodiment according to FIG. 1, an additional spur gear stage S3 is downstream from the transmission and is connected to a differential D of the vehicle. As diagrammatically shown in FIG. 6, the output shaft of the transmission connected to the input shaft of the differential D by at least one planetary gear.

Within the scope of one advantageous development of the invention, only the second clutch 58 and third clutch 59 can be designed as friction shift elements capable of permanent slip, whereby measures against irregular rotation are irrelevant.

FIG. 2 shows an example of a shift pattern of a multi-stage transmission according to FIG. 1. Three shift elements are engaged for every gear. The shift pattern shows, as examples, the particular transmission ratios i of the individual gear steps and, to be determined therefrom, the gear increments or step changes φ to the next higher gear, wherein the value 8.040 is the transmission ratio spread.

Figure 3:
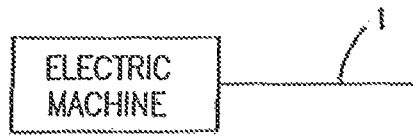
FIG. 3: diagrammatically shows an electrical machine disposed on the input shaft of the multi-stage transmission according to the invention.

In the portrayed example, the values for the stationary transmission ratio of the planetary gear set designed as minus planetary gear sets P1, P2, P3 are respectively −1.720, −1.630 and −1.580, wherein the transmission ratios of the first and second spur gear stage S1, S2 are respectively 1.000 and 1.970. FIG. 3 shows that only one shift element must be engaged and one shift element must be disengaged when shifting sequentially, since two neighbouring gear steps jointly use two shift elements. It is also shown that a large transmission ratio spread is attained with small gear increments.

The first forward gear is attained by engaging the brake 03 and the first and third clutch 15, 59; the second forward gear is attained by engaging the brake 03 and the third and first clutch 59, 56; the third forward gear is attained by engaging the first, third and fourth clutch 15, 59, 56; the fourth forward gear is attained by engaging the second, third and fourth clutch 58, 59, 56; the fifth forward gear is attained by engaging the first, second and third clutch 15, 58, 59; the sixth forward gear, which is designed as a direct gear, is attained by engaging the first, second and fourth clutch 15, 58, 56; the seventh forward gear is attained by engaging the brake 03 and the first and second clutch 15, 58; and the eighth forward gear is attained by engaging the brake 03 and the second and fourth clutch 58, 56, wherein the reverse gear is attained by engaging the brake 03 and the second and third clutch 58, 59, Since the brake 03 and the third clutch 59 are engaged in the first forward gear and in the reverse gear, these shift elements can be used as start-up elements.

According to the invention, different gear increments also result from the same gear pattern depending on the shift logic, thereby making it possible to implement an application-specific or vehicle-specific variation.

Figure 4:
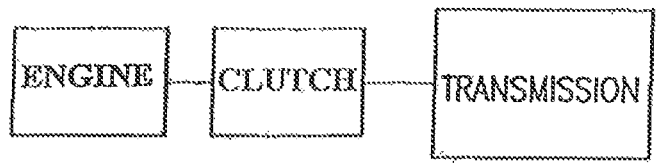
FIG. 4: diagrammatically shows a clutch provided between an engine and the multi-stage transmission according to the invention.

In principle, an electric machine or an additional drive source can be disposed on each shaft of the transmission according to the invention. In a particularly advantageous development of the invention, an electric machine can be provided that is disposed on the driveshaft 1 and is directly connected to the driveshaft 1 as diagrammatically shown in FIG. 3. A fifth clutch can be provided by means of which the internal combustion engine can be decoupled from the transmission as diagrammatically shown in FIG. 4, whereby all gears of the transmission can be advantageously driven exclusively electrically.

Figure 5:
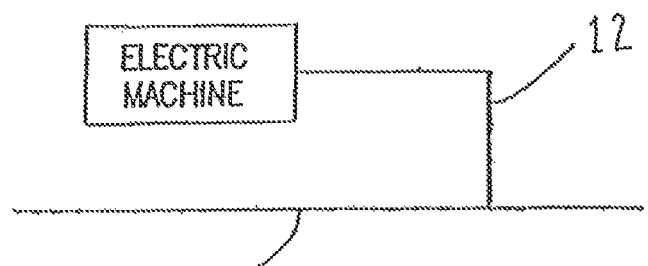
FIG. 5: diagrammatically shows an electrical machine disposed parallel to the input shaft of the multi-stage transmission according to the invention.

As an alternative to directly connecting the electric machine to the input driveshaft, the electric machine can be disposed axially parallel to the input driveshaft 1 and connected to the input driveshaft 1 by means of a gear stage or a chain drive 12 as diagrammatically shown in FIG. 5, wherein a fifth clutch can be optionally provided by means of which the internal combustion engine can be decoupled from the transmission.

According to the invention, it is possible to provide additional freewheels at each suitable location of the multi-stage transmission, for example, between a shaft and the housing, or possibly to connect two shafts.

According to the invention, an axle differential and/or a distributor differential can be disposed on the drive side or on the output side.

Within the scope of advantageous developments, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch can be used as the clutch element. it is also possible to dispose such a start-up element in the power flow direction behind the transmission wherein, in this case, the drive shaft 1 is continuously connected to the crankshaft of the drive motor.

The multi-stage transmission, according to the invention, also makes it possible to situate a torsional-vibration damper between the drive motor and the transmission.

Within the scope of a further, not represented embodiment of the invention, a wear-free brake, for instance, a hydraulic or electric retarder or the like, can be disposed on each shaft, preferably on the drive shaft 1 or the output shaft 2, which is of special significance for use in commercial vehicles in particular. Furthermore, a power take-off drive can be provided on each shaft, preferably on the input driveshaft 1 or the output shaft 2, for driving additional assemblies.

The friction shift elements that are used can be designed as power shiftable clutches or brakes. In particular, force locking clutches or brakes can be used, for instance, lamellar clutches, band brakes, and/or cone clutches. Furthermore, the individual shift elements can be designed as form-locking switch elements.

Reference Characters

1 First shaft, input driveshaft
2 Second shaft, output shaft
3 Third shaft
4 Fourth shaft
5 Fifth shaft
6 Sixth shaft
7 Seventh shaft
8 Eighth shaft
9 Ninth shaft
03 Brake
15 First clutch
56 Fourth clutch
58 Second clutch
59 Third clutch
D Differential
G Housing
P1 First planetary gear set
P2 Second planetary gear set
P3 Third planetary gear set
S1 First spur gear stage
S2 Second spur gear stage
S3 Third spur gear stage
ST1 First spur gear of the first spur gear stage S1
ST2 Second spur gear of the second spur gear stage S1
ST3 First spur gear of the second spur gear stage S2
ST4 Second spur dear of the second spur gear stage S2 i Transmission ratio
φ Step change

The invention claimed is:

1. A multi-stage automatic transmission, for a motor vehicle, the transmission comprising:
an input shaft (1) and an output shaft (2)
first, second and third planetary gear sets (P1, P2, P3), each of the first, the second and the third planetary gear sets comprising a sun gear, a ring gear and a carrier;
first and second spur gear stages (S1, S2) being connected to a countershaft, which is disposed parallel to a longitudinal axis of the first, the second and the third planetary gear sets (P1, P2, P3) and serving as the output shaft (2) of the transmission, and the first and second spur gear stages (S1, S2) disposed inside a housing (G);
at least third, fourth, fifth, sixth, seventh, eighth, and ninth rotatable shafts (3, 4, 5, 6, 7, 8, 9);
at least five shift elements (03, 15, 56, 58, 59,) comprising a brake (03) and first, second, third and fourth clutches (15, 58, 59, 56) whose selective engagement results in different transmission ratios between the input shaft (1) and the output shaft (2) so that eight forward gears and one reverse gear are implementable;
the input drive shaft (1) is connected to the carrier of the first planetary gear set (P1) and, by engagement of the first clutch (15), the input drive shaft (1) being releasably connected to the fifth shaft (5), the fifth shaft, by engagement of the third clutch (59), being connected to the ninth shaft (9) which is connected to the sun gear of the third planetary gear set (P3), and the fifth shaft (5), by engagement of the second clutch (58), being releasably connectable to the eighth shaft (8) which is connected to the ring gear of the second planetary gear set (P2);
the ring gear of the first planetary gear set (P1) being connected to the sixth shaft (6) which also connected to the sun gear of the second planetary gear set (P2);
the third shaft (3) is connected to the sun gear of the first planetary gear set (P1) and the ring gear of the third planetary gear set (P3) and the third shaft (3) is connectable, via engagement of the brake (03), to the housing (G) of the transmission;
the carrier of the second planetary gear set (P2) being connected to the fourth shaft (4) which is connected to a first spur gear (ST1) of the first spur gear stage (S1) and a second spur gear (ST2) of the first spur gear stage (S1) being connected to the output shaft (2);
the carrier of the third planetary gear set (P3) being connected to the seventh shaft (7) which is connected to a first spur gear (ST3) of the second spur gear stage (S2) and a second spur gear (ST4) the second spur gear stage (S2) being connected to the output shaft (2); and
the fourth clutch (56) releasably connecting the fifth shaft (5) to the sixth shaft (6) such that, when the fourth clutch (56) and the second clutch (58) are engaged, the second planetary gear set (P2) is blocked by the coupling of the sun gear of the second planetary gear (P2) set to the ring gear of the second planetary gear set (P2).

2. The multi-stage transmission according to claim 1, wherein the first, the second and the third planetary gear sets (P1, P2, P3) are designed as minus planetary gear sets.

3. The multi-stage transmission according to claim 1, wherein the second planetary gear set (P2), when viewed radially, is disposed about the first planetary gear set (P1).

4. The multi-stage transmission according to claim 3, wherein the first, the second and the third planetary gear sets (P1, P2, P3) are disposed in a sequence of both the first planetary gear set P1 and the second planetary gear set P2, and then the third planetary gear set P3.

5. The multi-stage transmission according to claim 1, wherein an electric machine is provided that is either disposed on the input drive shaft of the transmission and is directly connected to the input drive shaft, or is disposed axially parallel to the input drive shaft and is connected to the input drive shaft by either a gear stage or a chain drive.

6. The multi-stage transmission according to claim 5, wherein a fifth clutch is provided by which an internal combustion engine is decouplable from the transmission, whereby all gears of the transmission can be driven exclusively by the electric machine.

7. The multi-stage transmission according to claim 1, wherein a first forward gear is implemented by engagement of the brake (03) and the first and the third clutches (15, 59);
a second forward gear is implemented by engagement of the brake (03) and the third and the fourth clutches (59, 56);
a third forward gear is implemented by engagement of the first, the third and the fourth clutches (15, 59, 56);
a fourth forward gear is implemented by engagement of the second, the third and the fourth clutches (58, 59, 56);
a fifth forward gear is implemented by engagement of the first, the second and the third clutches (15, 58, 59);
a sixth forward gear is implemented by engagement of the first, the second and the fourth clutches (15, 58, 56);
a seventh forward gear is implemented by engagement of the brake (03) and the first and second clutches (15, 58);
an eighth forward gear is implemented by engagement of the brake (03) and the second and the fourth clutches (58, 56); and
the reverse gear is implemented by engagement of the brake (03) and the second and the third clutches (58, 59).

8. The multi-stage transmission according to claim 1, wherein at least one mechanical component, belt or chain is disposed for transmitting torque either instead of, or in addition to, at least one of the first and the second spur gear stage.

9. The multi-stage transmission according to claim 1, wherein the output shaft (2) is connected to a drive shaft of a differential by at least one planetary gear.

10. A multi-stage automatic transmission for a motor vehicle, the transmission comprising:
an input shaft (1) and an output shaft (2);
first, second and third planetary gear sets (P1, P2, P3), each of the first, the second and the third planetary gear sets comprising a sun gear, a ring gear and a carrier;
first and second spur gear stages (S1, S2) being connected to a countershaft, which is disposed parallel to a longitudinal axis of the first, the second and the third planetary gear sets (P1, P2, P3) and serving as the output shaft (2) of the transmission, which are disposed inside a housing (G);
at least third, fourth, fifth, sixth, seventh and eighth rotatable shafts (3, 4, 5, 6, 7, 8);
at least five shift elements (03, 15, 56, 58, 59) comprising a brake (03) and first, second, third and fourth clutches (15, 58, 59, 56) and selective engagement of the at least five shift elements results in different transmission ratios between the input shaft (1) and the output shaft (2) such that eight forward gears and one reverse gear are implementable;
the input drive shaft (1) being continuously connected to the carrier of the first planetary gear set (P1) and being connectable, via engagement of the first clutch (15), to the fifth shaft (5);

the output shaft (2) being continuously connected to a second spur gear (ST2) of the first spur gear stage (S1) and a second spur gear (ST4) of the second spur gear stage (S2);

the third shaft (3) being continuously connected to the sun gear of the first planetary gear set (P1) and the ring gear of the third planetary gear set (P3) and being connectable, via engagement of the brake (03), to the housing (G) of the transmission;

the fourth shaft (4) being continuously connected to the carrier of the second planetary gear set (P2) and to a first spur gear (ST1) of the first spur gear stage (S1);

the fifth shaft (5) being connectable, via engagement of the third clutch (59), to a ninth shaft (9), the fifth shaft (5) being connectable, via engagement of the second clutch (58), to the eighth shaft (8) and the fifth shaft (5) being connectable, via engagement of the fourth clutch (56), to the sixth shaft (6) such that, when the fourth clutch (56) and the second clutch (58) are engaged, the second planetary gear set (P2) is blocked by the coupling of the sun gear of the second planetary gear (P2) set to the ring gear of he second planetary gear set (P2);

the sixth shaft (6) being continuously connected to the ring gear of the first planetary gear set (P1) and the sun gear of the second planetary gear set (P2);

the seventh shaft (7) being continuously connected to the carrier of the third planetary gear set (P3) and a first spur gear (ST3) of the second spur gear stage (S2);

the eighth shaft (8) being continuously connected to the ring gear of the second planetary gear set (P2); and the ninth shaft (9) being continuously connected the sun gear of the third planetary gear set (P3).

\* \* \* \* \*